(12) United States Patent
Kim et al.

(10) Patent No.: US 7,230,905 B2
(45) Date of Patent: Jun. 12, 2007

(54) OPTICAL PICKUP USING TWO-WAVELENGTH LIGHT SOURCE MODULE AND METHOD FOR CORRECTING POSITION DIFFERENCE

(75) Inventors: Kun-soo Kim, Seoul (KR); Ju-hyung Lee, Gyeonggi-do (KR); Pyong-yong Seong, Seoul (KR); Sun-mook Park, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 679 days.

(21) Appl. No.: 10/455,363

(22) Filed: Jun. 6, 2003

(65) Prior Publication Data
US 2003/0227861 A1 Dec. 11, 2003

(30) Foreign Application Priority Data
Jun. 11, 2002 (KR) .............................. 2002-32520

(51) Int. Cl.
*G11B 7/135* (2006.01)
(52) U.S. Cl. .............................. 369/112.1; 369/112.15; 369/121; 369/112.01; 369/44.23
(58) Field of Classification Search ........... 369/112.15, 369/112.1, 112.05, 112.28, 121
See application file for complete search history.

(56) References Cited

U.S. PATENT DOCUMENTS
2002/0136132 A1* 9/2002 Kim et al. ............... 369/53.28

FOREIGN PATENT DOCUMENTS
| CN | 1335607 | 2/2002 |
|---|---|---|
| JP | 2001-307369 | 11/2001 |
| JP | 2002-116314 | 4/2002 |
| KR | 2002-0008795 | 1/2002 |

OTHER PUBLICATIONS

Office Action dated Nov. 19, 2004 in corresponding Chinese Patent Application No. 03131172.5.

* cited by examiner

*Primary Examiner*—Andrea Wellington
*Assistant Examiner*—Jorge L. Ortiz-Criado
(74) *Attorney, Agent, or Firm*—Staas & Halsey LLP

(57) ABSTRACT

An optical pickup includes a light source module in which first and second light sources that emit first and second light beams of different wavelengths are integrated into a single package, an objective lens that focuses the first and second light beams to form a light spot on a recording surface of a recording medium, a light path changer that changes a path along which the first and second light beams propagate, a photodetector that receives the first and second light beams entered via the objective lens and the light path changer and detects an information signal and/or error signal, and an optical element disposed on a path along which the first and second light beams propagate to act as a lens with respect to only one of the first and second light beams so as to correct a position difference along a light propagation direction between the first and second light sources. Accordingly, it possible to correct a position difference along a light propagation axis between the two light sources in the light source module. Obtaining the same light propagation axis is made possible by using the optical element to make the two light propagation axes coincidental or by using a separate optical element to perform this function. This allows the optical pickup to be used for recording as well as for reproducing.

49 Claims, 10 Drawing Sheets

OPTICAL PICKUP USING TWO-WAVELENGTH LIGHT SOURCE MODULE AND METHOD FOR CORRECTING POSITION DIFFERENCE

CROSS-REFERENCE TO RELATED APPLICATIONS

This application claims the benefit of Korean Patent Application No. 2002-32520, filed on Jun. 11, 2002, in the Korean Intellectual Property Office, the disclosure of which is incorporated herein by reference.

BACKGROUND OF THE INVENTION

1. Field of the Invention

The present invention relates to an optical pickup, and more particularly, to an optical pickup using a two-wavelength light source module in which two light sources that emit different wavelengths of light are integrated into a single package, and a method of correcting an optical position difference between the different light beams.

2. Description of the Related Art

Generally, DVD-CD compatible optical pickups are configured to have two separate light sources for a DVD and a CD. The problem with this is that it makes the configuration of an optical system more complicated and is subject to restrictions on installation space due to the needs to compose optical lens to best suit the characteristics of the DVD and the CD, and to assemble the two light sources.

In recent years, a light source module called TWIN-LD has been developed. This module is formed by integrating two light sources, that is, two semiconductor laser chips (LDs), to emit different wavelengths of light for a DVD and a CD, into a single package. However, since this light source module suffers from a large position difference between the light sources, it can only be used in optical pickups for reproducing, and not for recording.

SUMMARY OF THE INVENTION

Accordingly, it is an aspect of the present invention to provide an optical pickup having a two-wavelength light source module designed to be used for a recording as well as for a reproducing by configuring an optical system that can correct a position difference between two light sources in the light source module, and a method of correcting the position difference.

Additional aspects and advantages of the invention will be set forth in part in the description which follows and, in part, will be obvious from the description, or may be learned by practice of the invention.

To achieve the above and/or other aspects of the present invention, there is provided an optical pickup for recording and/or reproducing with respect to a recording medium, comprising a light source module in which first and second light sources that emit first and second light beams of different wavelengths are integrated into a single package, an objective lens which focuses the first and second light beams to form a light spot on a recording surface of the recording medium, a light path changer which changes a path along which the first and second light beams propagate, a photodetector which receives the first and second light beams entered via the objective lens and the light path changer and detects an information signal and/or error signal, and a first optical element which is disposed on the path along which the first and second light beams propagate to act as an lens with respect to only one of the first and second light beams so as to correct a position difference along a light propagation direction between the first and second light sources.

The optical pickup may further include a second optical element which is disposed on the path along which the first and second light beams propagate so as to make optical axes of propagation of the first and second light beams coincidental.

The second optical element may serve as a lens complementary to the optical element only with respect to one of the first and second light beams.

The second optical element may be disposed between the light source module and light path changer or between the light path changer and the photodetector.

The second optical element may additionally act as a cover glass of the light source module.

The optical element may also act to make optical axes of propagation of the first and second light beams coincidental.

The optical element may be disposed between the light source module and the light path changer or between the light path changer and the photodetector.

The optical element may additionally act as a cover glass of the light source module.

The first optical element may be disposed between the light path changer and the objective lens and comprise a transmissive type of polarizing hologram.

The optical pickup may further include a grating which splits one of the first and second light beams into at least three beams by diffraction while transmitting directly the other light beam.

The optical pickup may further include a second grating which splits a light beam of a wavelength transmitted directly through the grating into at least three beams while transmitting directly a light beam of a wavelength diffracted and split by the grating.

The grating may be integrated with the second grating.

At least one of the optical element and the second optical element may be integrated with the grating.

The light source module and the photodetector may be disposed so as to have the first and second light beams emitted from the light source module transmitted through the light path changer and propagate toward the recording medium and the first and second light beams reflected from the recording medium reflected by the light path changer to propagate toward the photodetector.

The light source module and the photodetector may be disposed so as to have the first and second light beams emitted from the light source module reflected from the light path changer to propagate toward the recording medium and the first and second light beams reflected from the recording medium transmitted through the light path changer to propagate toward the photodetector.

The light path changer may be a plate beam splitter.

The plate beam splitter may be oriented so as to have reflection angles of the first and second light beams be 45 degrees or less.

The optical pickup may further include an adjusting lens which fits a defocus of one of the first and second light beams propagating toward the photodetector.

The adjusting lens may act as an astigmatic lens.

The adjusting lens may act as a sensing lens.

The optical pickup may further include a collimating lens which is disposed between the light source module and the objective lens and collimates the first and/or second light beams divergently emitted from the light source module.

To achieve the above and/or other aspects of the present invention, there is provided a method of correcting a position difference between the first and second light sources of an optical pickup in which the first and second light sources that emit first and second light beams of different wavelengths are integrated into a single light source module, the optical pickup, for recording and/or reproducing data with respect to a storage medium, having an optical element and a photodetector, the method comprising configuring an optical system of the optical pickup so as to fit a defocus with respect to the first light beam emitted from the first light source, and in response to an axis of propagation direction of light beams from the first and second light sources being a z-axis, correcting a position difference along the z-axis between the first and second light sources by adjusting a position of the optical element of the optical pickup acting as a lens only with respect to the second light beam along the z-axis and fitting a defocus with respect to the second light beam.

The method may further comprise adjusting a position of the photodetector so that a spot of one of the first and second light beams emitted from the first and second light sources and reflected by the storage medium be received on a center of the photodetector of the optical pickup, and adjusting a position of a second optical element of the optical pickup that transmits directly one of the first and second light beams and refracts the other one at least twice in a rotating direction and/or in the z-axis direction so as to have a spot of the other light beam be received on the center of the photodetector to correct a second position difference between the first and second light sources so that optical axes of propagation of the first and second light beams emitted from the first and second light sources coincide with each other.

The optical pickup provides compatibility between a DVD family of optical disks and a CD family of optical disks. One of the first and second light beams may have a wavelength in a red wavelength region suitable for the DVD family of optical disks and the other light beam may have a wavelength in a near infrared wavelength region suitable for the CD family of optical disks.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
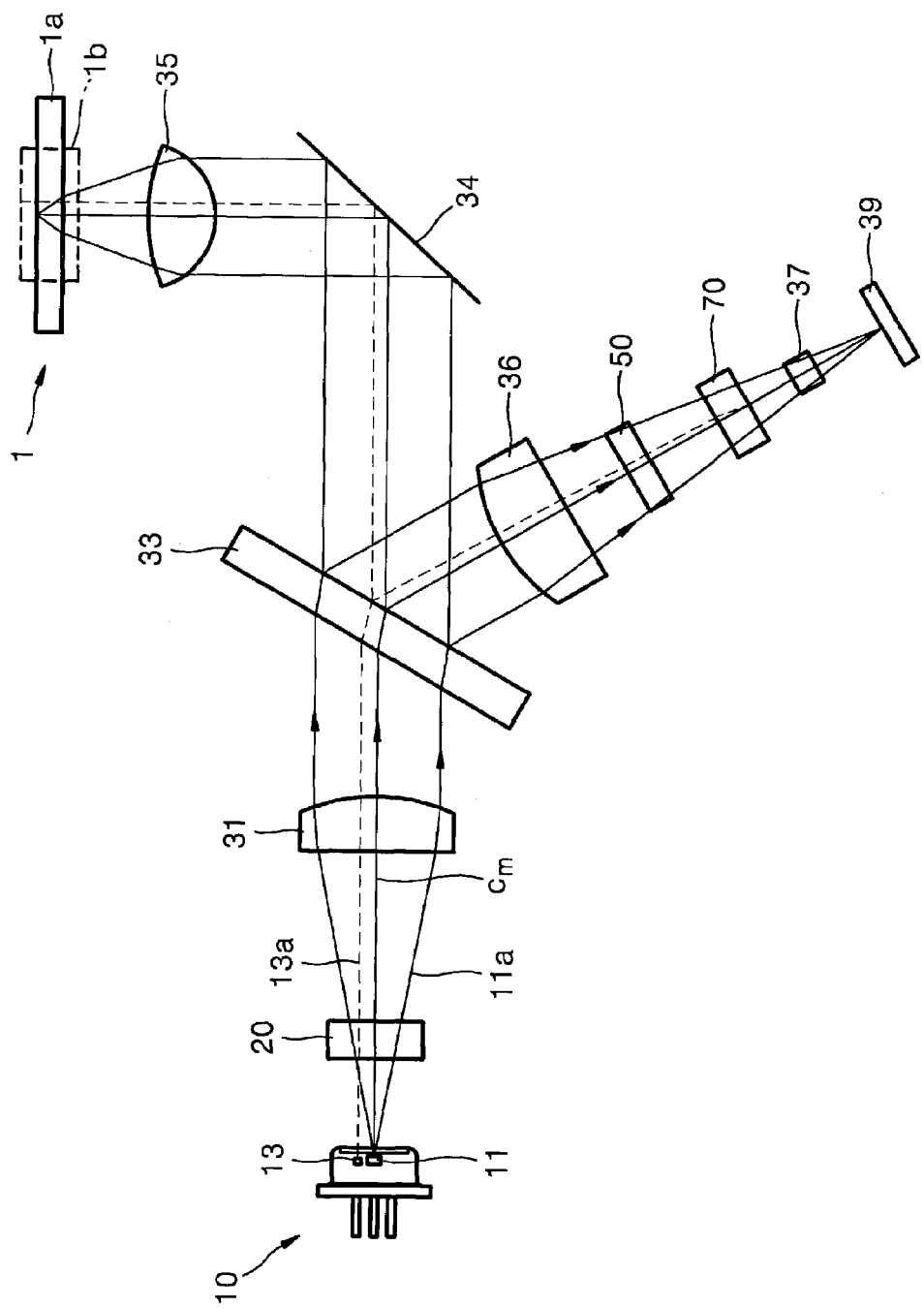
FIG. 1 is a top view of the optical configuration of an optical pickup adopting a two-wavelength light source module according to an embodiment of the present invention.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

FIG. 1 shows an optical pickup according to an embodiment of the present invention. The optical pickup includes a light source module 10 in which first and second light sources 11 and 13 that emit first and second light beams 11a and 13a are integrated into a single package, an objective lens 35 which focuses the first and second light beams 11a and 13a to form a light spot on a recording surface of an optical disk 1, a light path changer, for example, a plate beam splitter 33, which changes a travelling path of the first and second light beams 11a and 13a, a photodetector 39 which receives the first and second light beams 11a and 13a reflected by the optical disk 1 and entered via the objective lens 35 and the light path changer, and detects an information signal and/or an error signal, and a first optical element 50 which functions as a lens with respect to either of the first and second light beams 11a and 13a so as to correct a position difference along a direction in which light beams propagate between the first and second light sources 11 and 13.

Where a direction of propagation of light is a z-axis, the optical pickup according to the present invention may further include a second optical element 70 which is used to propagate the first and second light beams 11a and 13a along the same optical axis, so as to compensate a deviation of first and second light beams 11a and 13a from an optical axis due to a position difference (dx, dy) in the x-y plane between the first and second light sources 11 and 13.

For example, where the optical pickup according to the present invention provides compatibility between an optical disk 1a in a DVD family (hereinafter called DVD) and an optical disk 1b in a CD family (hereinafter called CD), the light source module 10 is provided to have the first light source 11 emit the first light beam 11a in a red wavelength region, for example, 650 nm, and the second light source 13 emit the second light beam 13a in a near infrared wavelength region, for example, 780 nm. That is, a semiconductor laser chip for a DVD is used as the first light source 11 whereas a semiconductor laser chip for a CD is used as the second light source 13.

Figure 2:
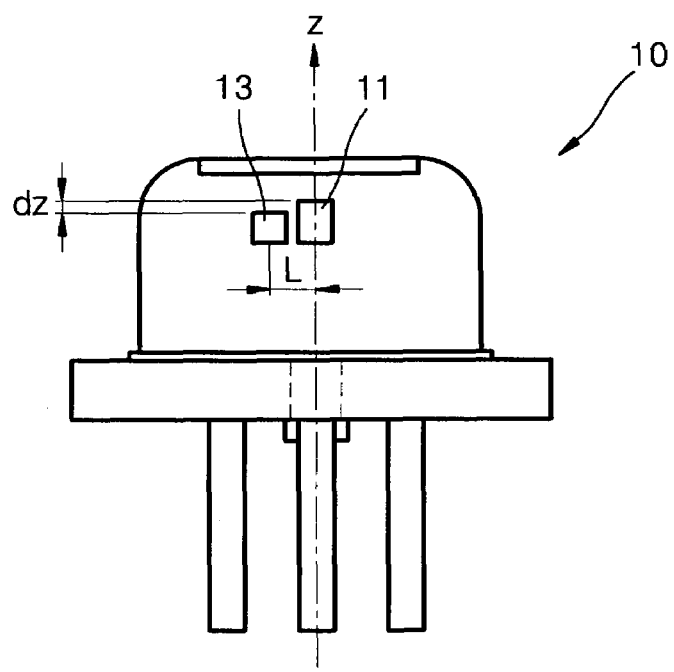
FIG. 2 is a front view illustrating a difference in position between first and second light sources in the light source module shown in FIG. 1, along an axis (z-axis) representing the direction along which a light beam propagates.

Here, where an axis along a propagation direction is z-axis, as shown in FIG. 2, there is a position difference dz along the z-axis between the first and second light sources 11 and 13 within the light source module 10.

Figure 3:
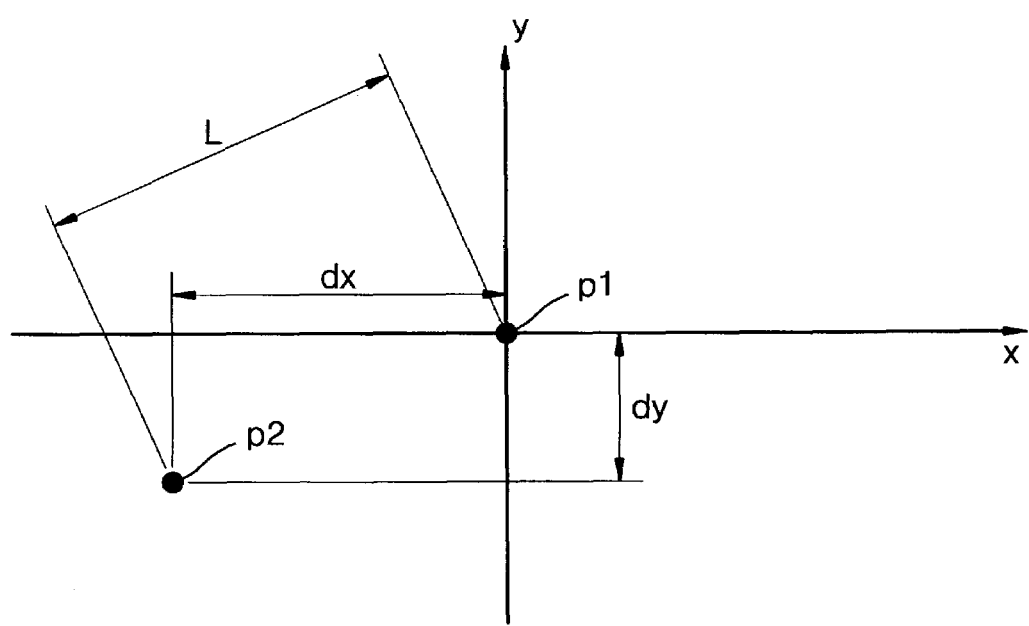
FIG. 3 is a graph illustrating a position difference in the x-y plane between the first and second light sources in the light source module of FIG. 1.

Furthermore, as shown in FIG. 3, there exists a position difference (dx, dy) in the x-y plane between the first and second light sources 11 and 13 in the light source module 10. In FIG. 3, p1 and p2 refer to emission positions of the first and second light sources 11 and 13, respectively.

In FIGS. 2 and 3, L refers to a distance between the first and second light sources 11 and 13. In the case of a TWIN-LD having a semiconductor laser chip for a DVD and a semiconductor laser chip for a CD, the distance L is in the order of 110±10 μm.

Referring back to FIG. 1, FIG. 1 shows an example in which the light source module 10 and the photodetector 39 are configured so as to transmit the first and second light beams 11a and 13a emitted by the light source module 10 through the light path changer towards the optical disk 1, and reflect the first and second light beams 11a and 13a, which are reflected from the optical disk 1, from the light path changer towards the photodetector 39.

For example, a plate beam splitter 33 which transmits and reflects the first and second light beams 11a and 13a in predetermined ratios may be used as the light path changer. The plate beam splitter 33 may be disposed so as to have reflection angles of the first and second light beams 11a and 13a be less than 45 degrees, for example, 30 degrees. The remaining optical components of the optical pickup according to the present invention are configured according to how the plate beam splitter 33 is disposed.

Here, an incidence/reflection angle of the plate beam splitter 33 is determined by taking into consideration its optical characteristics such as transmissivity/reflectivity and restrictions on disposition of optical components (i.e., applicable to a slim type recording and/or reproducing apparatus).

In the case of a recording apparatus, the ratio of transmissivity to reflectivity may be 90:10 or 10:90. Furthermore, it is desirable that transmissivities of two perpendicular linearly polarized light beams, which are p- and s-polarized light beams, be as similar as possible where birefringence is considered. According to coating characteristics of a reflection surface of a plate beam splitter, as an incidence angle is smaller, it is easier to satisfy desired spectroscopic characteristics.

Thus, where a beam splitter is disposed so that a reflection angle is less than 45 degrees, like the plate beam splitter 33 according to an embodiment of the present invention, it makes the coating design of a plate beam splitter easier while dealing with restrictions on disposition of optical components in a slim type recording and/or reproducing apparatus. Here, the plate beam splitter 33 is not necessarily disposed so that the reflection angle is less than 45 degrees.

That is, the plate beam splitter 33 may be disposed so that the reflection angle is 45 degrees.

Also, a cubic beam splitter may be used as the light path changer in place of the plate beam splitter 33. Furthermore, where the first optical element 50 is a transmissive type of polarizing hologram as in an embodiment to be described later, it is possible to use, as the light path changer, a plate or cubic polarizing beam splitter having a mirror surface designed to selectively transmit or reflect a light beam whose position difference along an axis of propagation direction has to be corrected depending on polarization states and to transmit and reflect the remaining light beam in a predetermined ratio.

The first optical element 50 may be disposed on a path along which the first and second light beams 11a and 13a travel and comprises a holographic element which transmits one light beam while having appropriate optical power to act as a lens with respect to the other light beam.

For example, where a defocus is fitted with respect to the first light beam 11a emitted from the first light source 11a cross the entire optical system of a compatible optical pick-up according to the present invention, in particular, at a light receiving part, the first optical element 50 may be provided so as to correct a difference in position of the second light source 13 along an axis along which light beams propagate (position deviation of the second light source 13 from the first light source 11 with respect to the axis of propagation).

Here, fitting the defocus with respect to the first light beam 11a, for example, where the optical pickup according to the present invention detects focus error signals using an astigmatic method, indicates that the entire optical system of the optical pick-up is configured to make a shape of the first light beam 11a received by the photodetector 39 circular, where a distance between the objective lens 35 and a recording surface of the optical disk 1 is in an on-focus state with respect to the first light beam 11a.

In contrast, where the defocus is fitted with respect to the second light beam 13a in the optical pick-up according to the present invention, the first optical element 50 is provided to correct a difference in position of the first light source 11 along the propagation axis.

The first optical element 50 provided in this way is finely adjusted along the optical axis of propagation, that is, in a z-axis direction, to correct a position difference of the light source module 10 along the optical axis of propagation.

Although the first optical element 50 is located between the light path changer and the photodetector 39 in FIG. 1, it may be positioned between the light source module 10 and the light path changer.

The second optical element 70 is disposed on a path along which the first and second light beams 11a and 13a travel so that a light beam emitted from one light source of the light sources 11 and 13 disposed away from a central optical axis $c_m$ of the optical system of the optical pick-up according to the present invention can propagate on the same optical axis as a light beam emitted from the other light source disposed along the central optical axis $c_m$. FIG. 1 shows an example in which the second optical element 70 is disposed between the light path changer and the photodetector 39. The second optical element 70 may also be disposed between the light source module 10 and the light path changer.

For the second optical element 70, a holographic element may be used. The holographic element transmits either of the first and second light beams 11a and 13a and diffracts the other light beam into positive first order or negative first order so as to propagate the first and second light beams 11a and 13a along the same optical axis. In this case, the holographic element forming the second optical element 70 is not given an optical power but a position coefficient.

FIG. 1 illustrates an example in which the first light source 11 is disposed on the central optical axis $c_m$ whereas the second light source 13 has a position difference in the x-y plane with respect to the first light source 11. In this case, the second optical element 70, as shown in FIGS. 4 and 5, is provided so as to transmit the first light beam 11a of a wavelength λ1 while acting as a holographic element to diffract the second light beam 13a of a wavelength λ2 into positive or negative first order, thus refracting the second light beam 13a to propagate along the same optical axis as the first light beam 11a.

Figure 4:
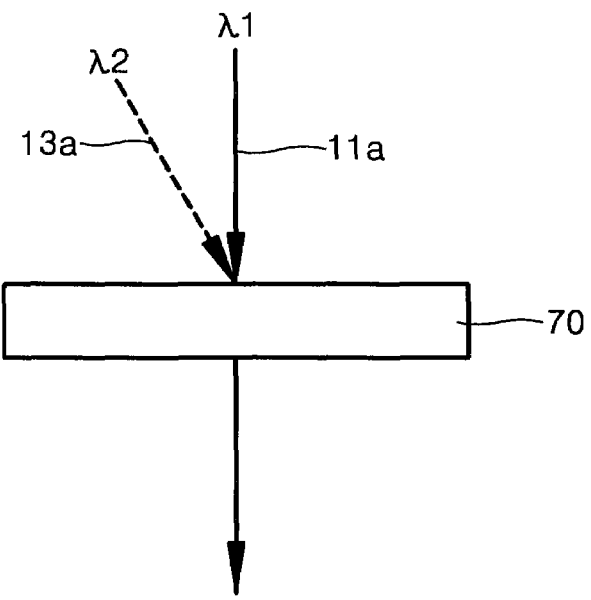
FIG. 4 is a view illustrating a propagation of first and second light beams where a second optical element shown in FIG. 1 is disposed at a light-receiver, that is, between a light path changer and a photodetector.

FIG. 4 shows propagation of the first and second light beams 11a and 13a where the second optical element 70 is disposed at the light receiving part, that is, between the light path changer and the photodetector 39.

Figure 5:
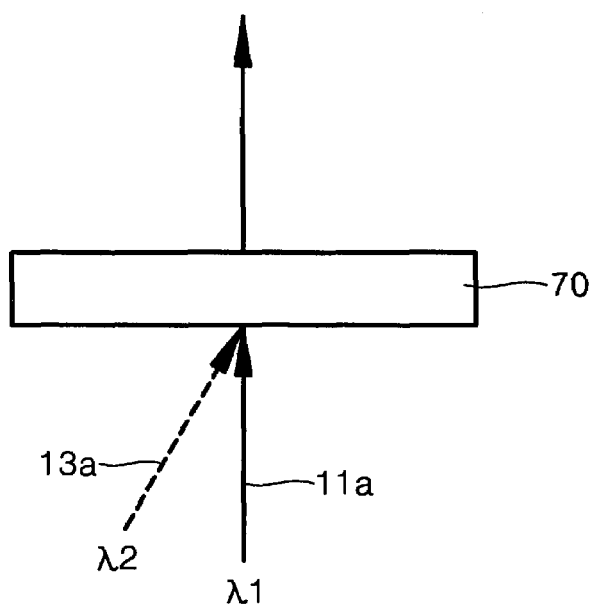
FIG. 5 is a view illustrating a propagation of the first and second light beams where the second optical element shown in FIG. 1 is disposed at a light transmitting portion, that is, between the light source module and the light path changer.

FIG. 5, with reference to FIG. 1, shows propagation of the first and second light beams 11a and 13a where the second optical element 70 is disposed at the light transmitting part, that is, between the light source module 10 and the light path changer. Where the second optical element 70 is disposed at the light transmitting part, as will be described in embodiments below, it may be integrated with a grating 20 or used as a cover glass of the light source module 10. In the case where the second optical element is used as the cover glass of the light source module 10, it is adjusted in advance in a rotating direction and in a z-axis direction during the fabrication of the light source module 10, so as to have the light propagation axis of the first light beam 11a emitted from the first light source 11 be the same as that of the second light beam 13a from the second light source 13.

In addition to this function, the second optical element 70 may be provided to serve as a lens complementary to the first optical element 50 with respect to either of the first and second light beams 11a and 13a. For example, where the first optical element 50 acts as a lens having positive power, the second optical element 70 is then provided to act as one having negative power. In this case, both the first and second optical element 50 and 70 serve to correct a position difference along the light propagation axis between the first and second light sources 11 and 13. Here, having positive power refers to acting as a convex lens while having negative power refers to acting as a concave lens.

Figure 6:
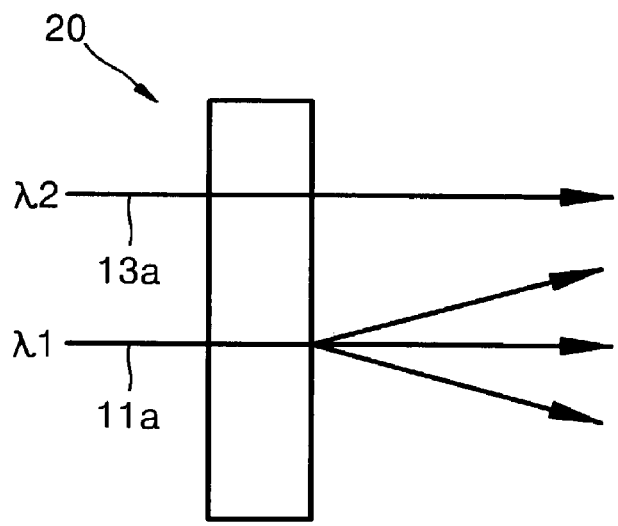
FIG. 6 is a first embodiment of a grating shown in FIG. 1.

The optical pickup according to the present invention may further include the grating 20 that splits at least one of the first and second light beams 11a and 13a emitted from the light source module 10 into three or more beams, thus enabling tracking error signal detection by use of a 3-beam method. For example, where the optical pickup according to the present invention is configured to detect a tracking error signal with respect to only the first light beam 11a using a 3-beam method, as shown in FIG. 6, the grating 20 is provided to transmit the second light beam 13a while splitting the first light beam 11a into at least three beams.

In contrast, where the optical pickup according to the present invention is configured to detect a tracking error signal with respect to only the second light beam 13a using a 3-beam method, the grating 20 may be provided to transmit the first light beam 11a while splitting the second light beam 13a into at least three beams.

Figure 7:
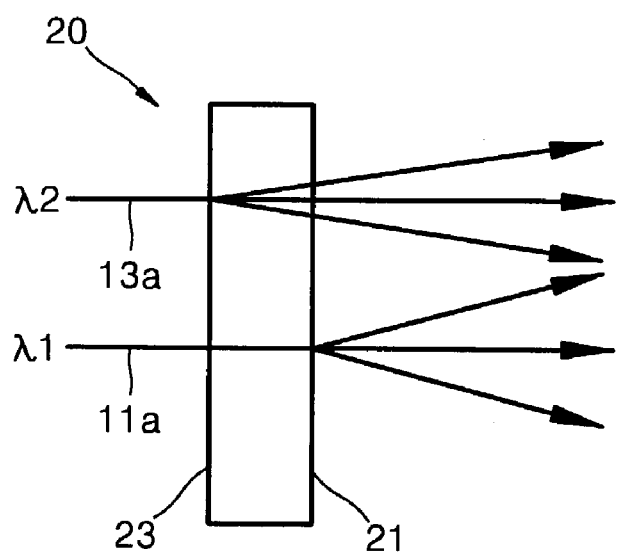
FIG. 7 is a second embodiment of a grating shown in FIG. 1.

Here, where at least one of the first and second optical elements 50 and 70 is disposed between the light source module 10 and the light path changer, at least one of the first and second optical elements 50 and 70 may be integrated with the grating 20. Since this is apparent from the optical configurations of an optical pickup according to the embodiments of the present invention described with reference to the accompanying drawings, a detailed description thereof will be omitted.

Where the optical pickup according to the present invention is configured to enable tracking error signal detection by way of a 3-beam method with respect to both the first and second light beams 11a and 13a, the grating 20 comprises a first grating 21 that splits the first light beam 11a into three beams and transmits the second light beam 13a, and a second grating 23 that transmits the first light beam 11a and splits the second light beam 13a into three beams. Although it has been shown in FIG. 7 that the first and second gratings 21 and 23 are formed on both surfaces of a transparent member to have an integrated structure, the first and second gratings 21 and 23 may be separated from each other.

Here, where at least one of the first and second optical elements 50 and 70 is disposed between the light source module 10 and the light path changer, at least one of the first and second optical elements 50 and 70 may be integrated with at least one of the first and second gratings 21 and 23. Since this is apparent from the optical configurations of an optical pickup according to the embodiments of the present invention described with reference to the accompanying drawings, a detailed description thereof will be omitted.

Referring back to FIG. 1, the optical pickup may further include an adjusting lens 37 to fit a defocus with respect to either of the first and second light beams 11a and 13a. The adjusting lens 37 is used as a sensing lens to have light spot received by the photodetector 39 to an appropriate size. Furthermore, the adjusting lens 37 may act as an astigmatic lens so as to have the optical pick-up according to the present invention detect a focus error signal using an astigmatic method. That is, the adjusting lens 37 may serve as both a sensing lens and as an astigmatic lens.

For example, where the object to correct a difference in position along the light propagation axis is the second light source 13, the adjusting lens 37 is used to fit a defocus with respect to the first light beam 11a. That is, where the optical pickup according to the present invention is compatible with DVD and CD disks, the adjusting lens 37 is used to adjust a defocus with respect to a DVD disk while the first optical element 50 is used to adjust a defocus with respect to a CD disk.

The optical pickup may further include a collimating lens 31 provided between the light source module 10 and the objective lens 35 to collimate the divergent first and second light beams 11a and 13a from the light source module 10. While the collimating lens 31 is disposed between the light source module 10 and the light path changer as shown in FIG. 1, it may be disposed between the light path changer and the objective lens 35. Where the collimating lens 31 is located between the light source module 10 and the light path changer as shown in FIG. 1, a condensing lens 36 may be provided at the light receiving part to condensate incident parallel first and second light beams 11a and 13a. Reference numeral 34 in FIG. 1 refers to a reflection mirror.

In the optical pickup having the above configuration according to the present invention, a method of correcting a position difference between the first and second light sources 11 and 13 will now be described.

Where the first optical element 50 is provided to act as a lens only with respect to the second light beam 13a and the axis representing a direction in which the light beams 11a and 13a from the first and second light sources 11 and 13 propagate is a z-axis, an optical system of the optical pick-up according to the present invention is aligned to fit a defocus with respect to the first light beam 11a from the first light source 11. Then, the first optical element 50 acting as a lens only with respect to the second light beam 13a is moved along the z-axis to fit a defocus with respect to the second light beam 13a, thus correcting a position difference along the z-axis between the first and second light sources 11 and 13.

Here, where the first optical element 50 is provided to act as a lens with respect to the first light beam 11a, the optical system is first aligned to fit a defocus with respect to the second light beam 13a, and then the first optical element 50 is used to fit a defocus with respect to the first light beam 11a.

Where the optical pickup according to the present invention includes an optical element, for example, the second optical element 70, to correct a position difference of a light source disposed away from the central optical axis $c_m$, a method of correcting a position difference (dx, dy) in the x-y plane between the first and second light sources 11 and 13 will now be described.

The position of the photodetector 39 is adjusted so that one of the first and second light beams 11a and 13a emitted from the first and second light sources 11 and 13, respectively, and reflected from the optical disk 1, which is a light spot from a light source disposed on the central optical axis $c_m$, is received on a center of the photodetector 39. Then, the second optical element 70 is adjusted in a rotating direction and/or the z-axis direction so that the other light spot is received on the center of the photodetector 39, thus correcting a position difference between the first and second light sources 11 and 13 so as to have the propagation axis of the first light beam 11a coincide with that of the second light beam 13a. In this case, the second optical element 70 transmits the former light beam and refracts the latter light beam at least twice.

In the optical pickup having the above configuration, a method of correcting a position difference dz along the propagation direction (z-axis) between the first and second light sources 11 and 13 and a position difference (dx, dy) in the x-y plane therebetween will now be described in more detail with reference to FIGS. 8–12.

Figure 8:
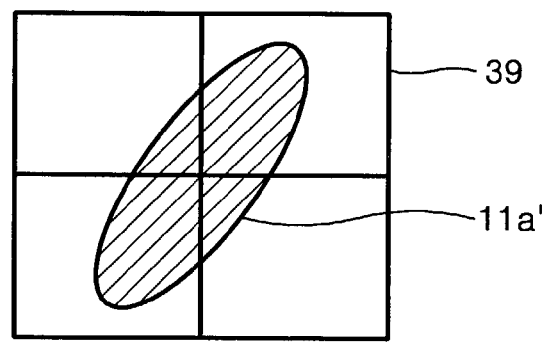
FIG. 8 is a view illustrating a shape of a first light beam received on a center of a photodetector before a defocus is fitted.
Figure 9:
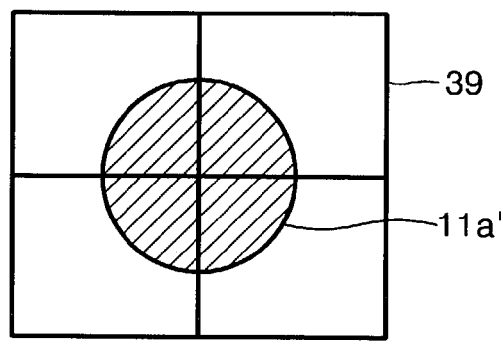
FIG. 9 is a view illustrating a shape of a first light beam received by a photodetector after a defocus has been fitted.
Figure 10:
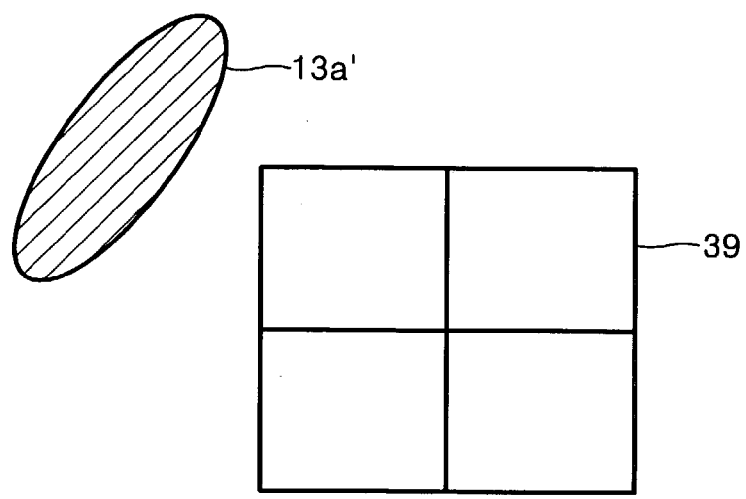
FIG. 10 is a view illustrating a position of a second light beam in the plane at which a photodetector is located before a position difference (dx, dy) in the x-y plane between the first and second light sources is corrected.

Assuming that the first light source 11 is disposed on the central optical axis $c_m$ and the second light source 13 has a position difference dz with respect to the first light source 11 along the propagation direction (z-axis), FIG. 8 shows the shape of the first light beam 11a (hereinafter called a first light spot 11a') received by the photodetector 39 before a defocus is fitted where the first light source 11 is operated to emit the first light beam 11a from the light source module 10. FIG. 8 shows a state in which the position of the photodetector 39 is adjusted in the x-axis or y-axis direction so that the center of the first light spot 11a' coincides with that of the photodetector 39.

Where the adjusting lens 37 is moved along the z-axis direction as the first light spot 11a' coincides with the center of the photodetector 39, as shown in FIG. 8, a defocus with respect to the first light beam 11a is fitted, thus the first light spot 11a' of an approximately circular shape is formed on the photodetector 39 as shown in FIG. 9. Here, FIGS. 8 and 9 show examples in which an optical pickup according to the present invention includes the adjusting lens 37. Where the optical pickup does not include the adjusting lens 37 and the optical system is aligned during the assembly so as to fit a defocus with respect to the first light beam 11a, the first light spot 11a' is formed in an approximately circular shape on the center of the photodetector 39 as shown in FIG. 9.

Where the first light source 11 is turned off and the second light source 13 is turned on with a defocus fitted with respect to the first light beam 11a, the shape of the second light beam 13a (hereinafter called a second light spot 13a') irradiated in the plane at which the photodetector 39 is placed deviates from the center of the photodetector 39, as shown in FIG. 10, since propagation axes of first and second light beams 11a and 13a do not coincide due to a position difference (dx, dy) in the x-y plane between the first and second light sources 11a and 13a. Furthermore, the second light spot 13a' is defocused due to a position difference dz along an axis of propagation direction between the first and light sources 11 and 13. Here, FIG. 10 shows a state in which the second optical element 70, to correct the position difference (dx, dy) in the x-y plane, and the first optical element 50, to correct the position difference dz along the axis of propagation direction, have not been inserted into the optical system of optical pickup.

Figure 11:
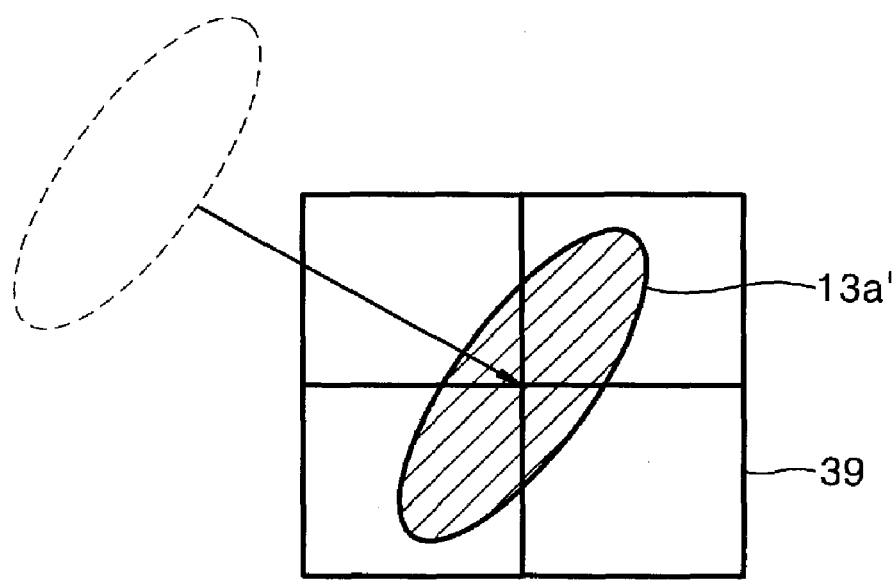
FIG. 11 is a view illustrating a second light beam received from a center of a photodetector after a position difference (dx, dy) in the x-y plane between the first and second light sources has been corrected.
Figure 12:
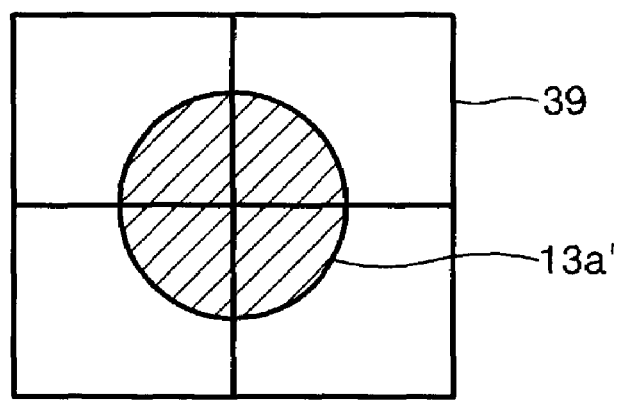
FIG. 12 is a view illustrating a shape of a second light beam received by a photodetector after a defocus has been fitted.

However, since the optical pick-up of the present invention includes the first and second optical elements 50 and 70, the second light spot 13a' is formed on the center of the photodetector 39 by an action of the second optical element 70, as shown in FIG. 11, and a defocus is fitted by an action of the first optical element 50, as shown in FIG. 12. Thus, the second light spot 13a' of an approximately circular shape is formed on the center of the photodetector 39.

Adjustments of the position and defocus of the second light spot 13a', as shown in FIGS. 11 and 12, are made during the assembly of an optical system for an optical pickup. Since it is not exactly known in which direction and to what extent the second light source 13 deviates from the first light source 11 in the x-y plane, the second optical element 70 is rotated (along a θ-axis) during the assembly operation in the plane parallel to the x-y plane, and the position of the second optical element 70 is adjusted along a z-axis until the second light spot 13a' is moved precisely to the center of the photodetector 39. Where the second light spot 13a' is moved to the center of the photodetector 39 in this manner, the position of the second optical element 70 is fixed.

Furthermore, since the degree to which the second light source 13 has a position difference dz along the axis of propagation direction (z-axis) with respect to the first light source 11 is not known, the first optical element 50 is moved along the propagation axis (z-axis) during the assembly until a defocus of the second light spot 13a' is corrected. Where the defocus of the second light spot 13a is fitted in this manner, the position of the first optical element 50 is fixed.

Here, an optical pickup according to the present invention may be configured to include only an optical element to correct the position difference dz along the propagation axis between the first and second light sources 11 and 13. In this case, the photodetector 39 may be constructed to receive and detect the first and second light beams 11a and 13a considering a position difference between the first and second light sources 11 and 13 in the x-y plane.

With references to FIGS. 8–12, it has been described that use of the optical pick-up according to the present invention allows correction of a position difference between the two light sources 11 and 13 in the two-wavelength light source module 10. While it has been shown in FIGS. 8–12 that the photodetector 39 is divided into four sections, the photodetector 39 may be further constructed of sub-photodetectors to receive all remaining split beams, where the optical pick-up includes the grating 20 as described with references to FIGS. 6 and 7.

Although it has been shown and described that a light spot, the defocus of which has not been fitted, is elliptical while a light spot, the defocus of which has been fitted, is circular in order to explain that a position difference between the two light sources 11 and 13 in the 2-wavelength light source module 10 can be corrected by using the optical pickup according to the present invention, this is only for an illustrative purpose, and the light spot may have different shapes.

Optical pickups according to other embodiments of the present invention will now be described. The method of correcting a position difference as described earlier also applies to these optical pickups.

Figure 13:
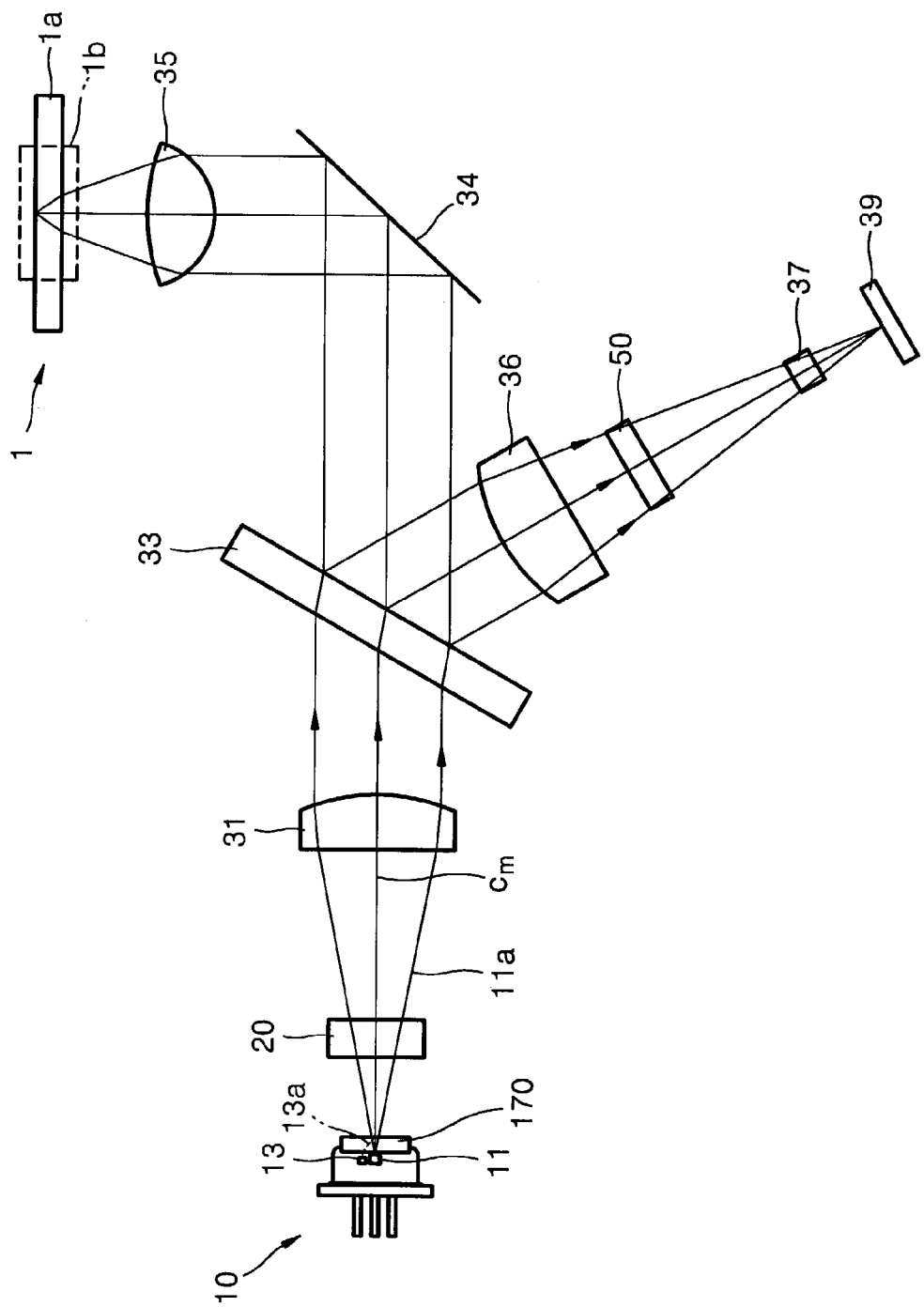
FIG. 13 is a top view of an optical configuration of an optical pickup according to another embodiment of the present invention.

FIG. 13 shows the optical configuration of an optical pickup according to another embodiment of the present invention. Here, a second optical element 170 which acts as a cover glass of a light source module 10 is disposed between the light source module 10 and a light path changer, for example, a plate beam splitter 33. Here, elements having substantially the same function as that in FIG. 1 are denoted by the same reference numeral, and thus their description will be omitted.

Where the second optical element 170 is provided to act as a cover glass of the light source module 10, as shown in FIG. 13, the position of the second optical element 170 is adjusted along a θ- or z-axis direction, in advance, during the fabrication of the light source module 10 so as to have optical axes of propagation of the first and second light beams 11a and 13a coincide.

Although FIG. 13 shows an example in which the second optical element 170 serves as a cover glass of the light source module 10, it is also possible for the first optical element 50 to act as the cover glass of the light source module 10 instead of the second optical element 170.

Figure 14:
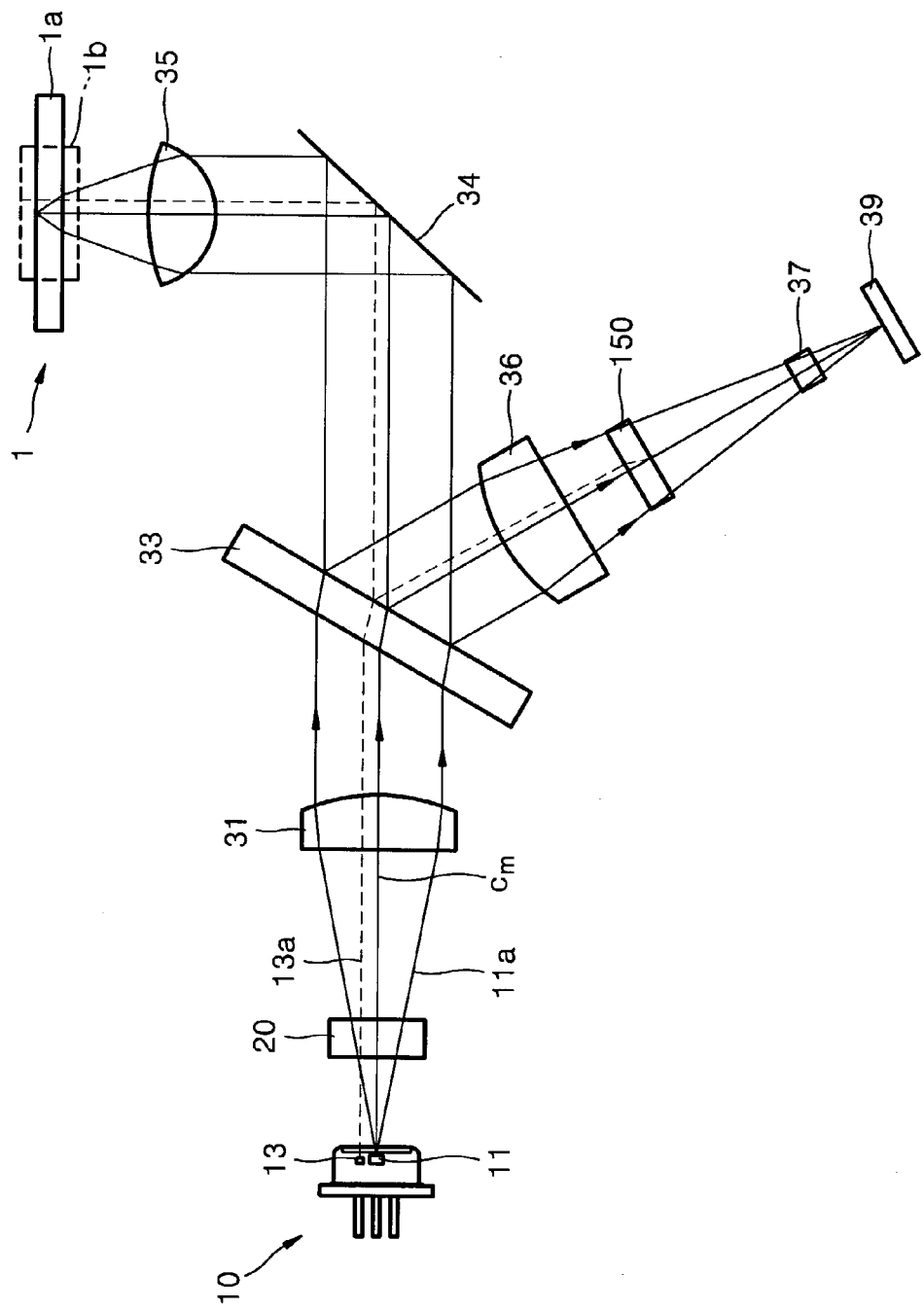
FIG. 14 is a top view of an optical configuration of an optical pickup according to yet another embodiment of the present invention.

FIG. 14 shows the optical configuration of an optical pickup according to yet another embodiment of the present invention, having only one optical element 150. Here, elements having substantially the same function as that in FIG. 1 are denoted by the same reference numeral, and thus their description will be omitted.

The optical element 150 acts to correct a position difference along an optical axis of propagation between the first and second light sources 11 and 13. The optical element 150 may also serve to make the optical axes of propagation of the first and second light beams 11a and 13a coincidental. The optical element 150 may be positioned between the light path changer and the photodetector 39, as shown in FIG. 14, or between the light source module 10 and the light path changer.

Where the optical element 150 is disposed between the light source module 10 and the light path changer, it may also serve as a cover glass of the light source module 10, as described in earlier embodiments of the present invention.

Since the optical element 150 applied to the embodiment shown in FIG. 14 can be sufficiently understood from other earlier embodiments of the present invention, a detailed description thereof will be omitted.

Figure 15:
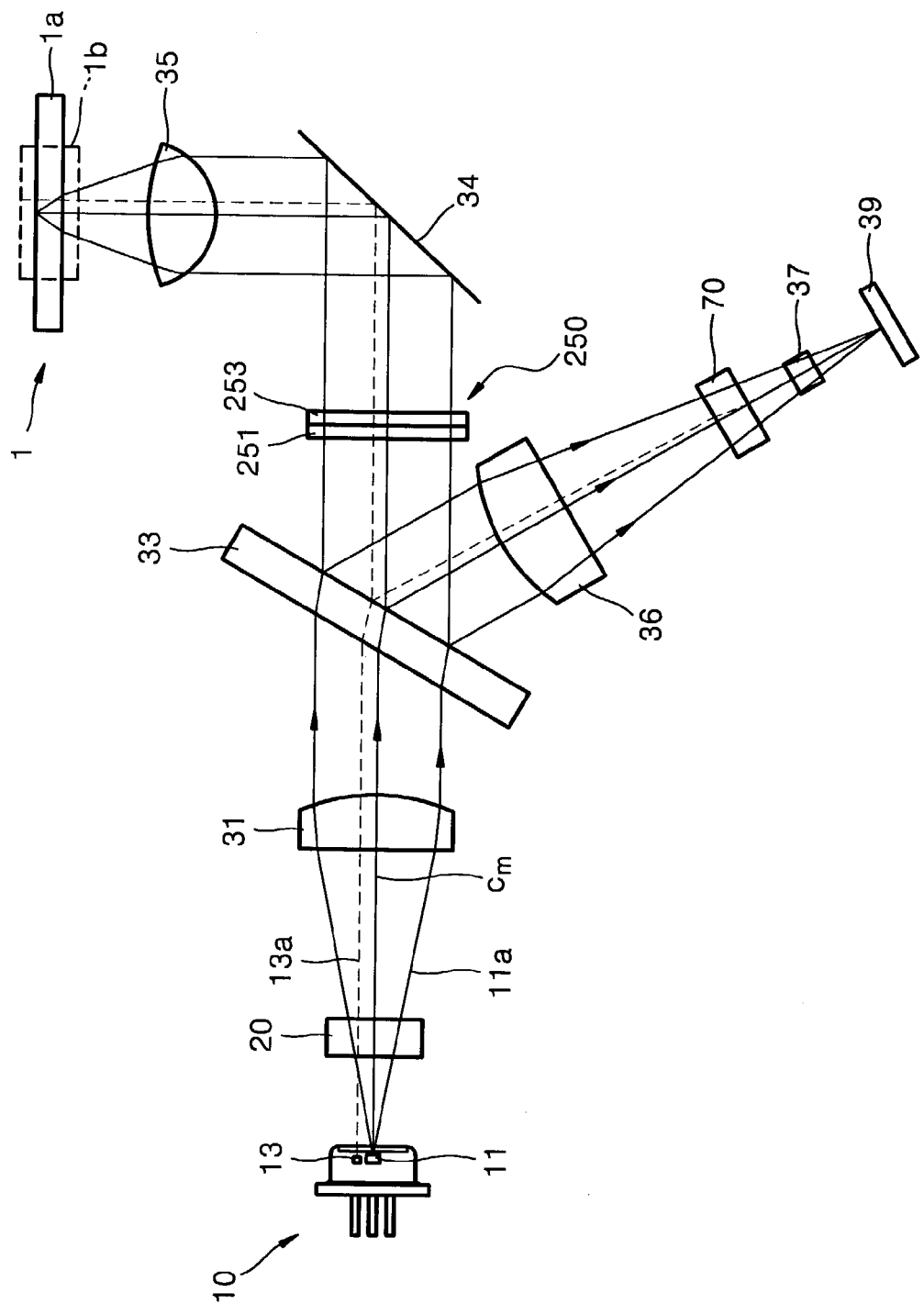
FIG. 15 is a top view of an optical configuration of an optical pickup according to still another embodiment of the present invention.

FIG. 15 shows the optical configuration of an optical pickup according to still another embodiment of the present invention. Here, a first optical element 250 is disposed between the light path changer and the objective lens 35. Again, elements having substantially the same or similar function to that in the embodiments described earlier are denoted by the same reference numeral, and thus their description will be omitted.

Where the first optical element 250 is disposed between the light path changer and the objective lens 35, as shown in FIG. 15, the first optical element 250 may be constructed by a transmissive type of polarizing hologram which acts only on either of the two light beams 11a and 13a subject to correction for a position difference along an optical axis of propagation.

For example, where a light beam subject to correction for a position difference along an optical axis of propagation is the second light beam 13a, and the first optical element 250 acts only on the second light beam 13a, the first optical element 250 may comprise a polarizing hologram 251 that transmits the first light beam 11a and acts as a lens only with respect to one polarization component of the second light beam 13a, and a wave plate 253 that changes the polarization of incident light, for example, a quarter-wave plate with respect to the wavelength of the second light beam 13a.

Considering the fact that semiconductor laser chips may be used as the first and second light sources 11 and 13, and a laser beam having a dominant polarization of s- or p-polarizations is emitted from a semiconductor laser, the first optical element 250 acts as a lens only with respect to the second light beam 13a propagating in one direction after having been emitted from the light source module 1 or reflected from the optical disk 1.

For example, where the s-polarized second light beam 13a mostly emitted from the light source module 10 and a hologram of the first optical element 250 acts as a lens only with respect to the s-polarized second light beam 13a, the first light beam 11a emitted from the light source module 10 transmits through the first optical element 50. In contrast, the s-polarized second light beam 13a is converged or diverged by the polarizing hologram 251 of the first optical element 250 and passes through the wave plate 253 to be converted into one circularly polarized light beam. The second light beam 13a is reflected from the optical disk 1 and changed from the circularly polarized light beam to the other circularly polarized right beam perpendicular thereto. The second light beam 13a, which is the other circularly polarized light beam, passes through the wave plate 253 to be converted to a p-polarized light beam and transmits through the polarizing hologram 251 of the second optical element 70.

Although the wave plate 253 is used to change the polarization of the first light beam 11a, since the polarizing hologram 251 of the first optical element 250 acts as a lens only with respect to a s-polarized light beam having the same wavelength as the second light beam 13a, this change in polarization of the first light beam 11a by the wave plate 253 has no problem. Here, the first optical element 250 is provided to act only on the first light beam 11a where the first light beam 11a is subject to correction for a position difference along the optical axis of propagation.

Figure 16:
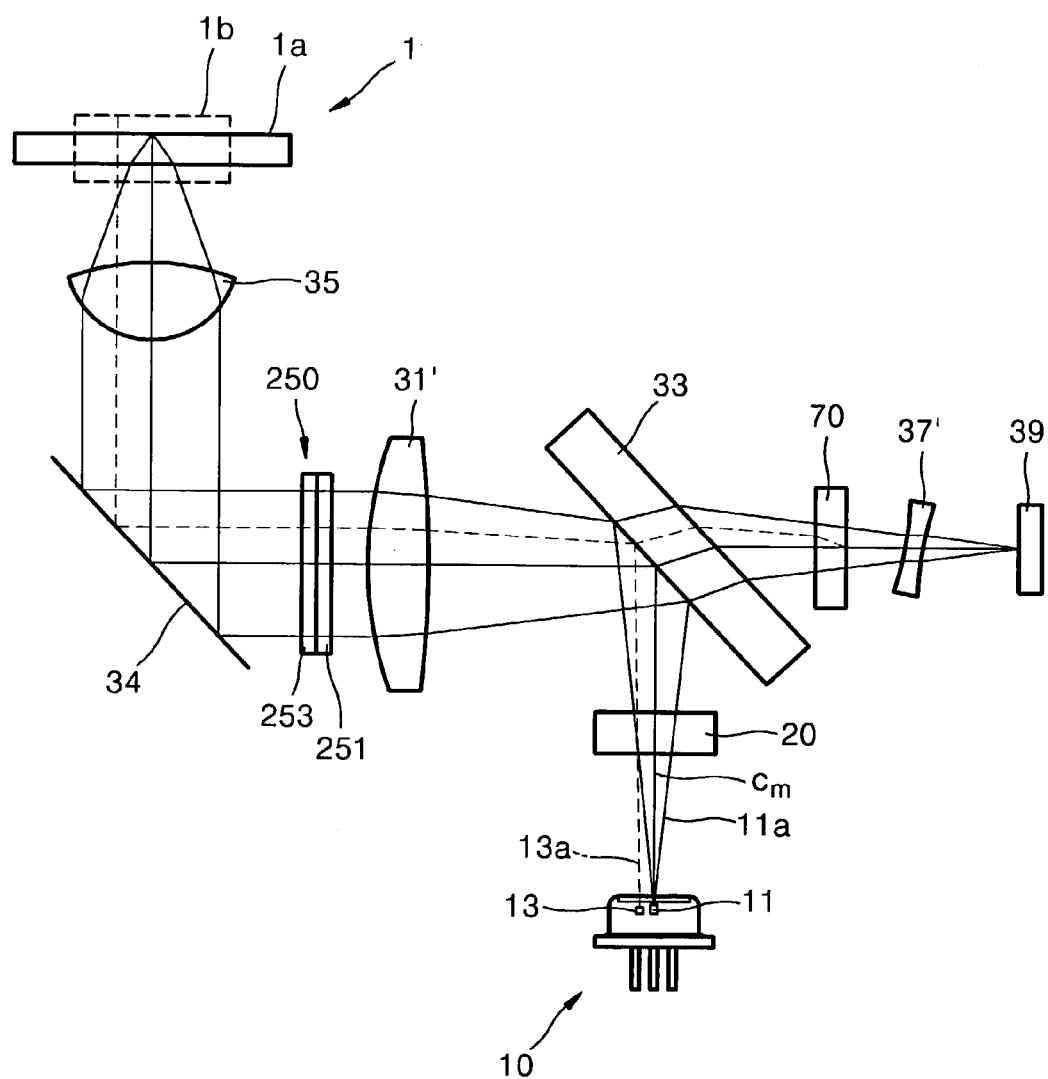
FIG. 16 is a top view of an optical configuration of an optical pickup according to still yet another embodiment of the present invention.

FIG. 16 shows an optical pickup according to still yet another embodiment of the present invention. Here, the first and second light beams 11a and 13a emitted from the light source module 10 are reflected by the light path changer and propagate toward the optical disk 1. With such an optical configuration and where the light path changer is the plate beam splitter 33, the adjusting lens 37 is oriented in a direction opposite to that in which the plate beam splitter 33 is tilted to correct coma aberrations in the first and second light beams 11a and 13a reflected from the optical disk 1 and transmitted through the plate beam splitter 33.

FIG. 16 further shows an example in which a collimating lens 31' that collimates the first and second diverged light beams 11a and 13a incident from the light source module 10 is disposed between the light path changer and the objective lens 35. In this configuration, the condensing lens 36 shown in the earlier embodiments may be not included.

Here, with respect to an embodiment illustrating the optical configuration in which the first and second light beams 11a and 13a from the light source module 10 are reflected from the light path changer and propagate towards the optical disk 1, this is not limited only to the configuration shown in FIG. 16, and various changes may be made to the embodiments described above.

As described above, an optical pickup according to the present invention includes an optical element which acts as a lens only with respect to one of two light beams having different wavelengths emitted from a light source module.

Furthermore, in the optical pickup, an optical element may act to make light propagation axes coincidental, or a separate optical element to perform the same function may be provided.

Accordingly, it possible to correct a position difference along a light propagation axis between two light sources within a light source module while making propagation axes of two light beams from the light source module coincidental, thus providing an optical pickup for recording as well as for reproducing.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical pickup for recording and/or reproducing with respect to a recording medium, comprising:
    a light source module in which first and second light sources that emit first and second light beams of different wavelengths are integrated into a single package;
    an objective lens which focuses the first and second light beams to form a light spot on a recording surface of the recording medium;
    a light path changer which changes a path along which the first and second light beams propagate;
    a photodetector which receives the first and second light beams entered via the objective lens and the light path changer; and
    an optical element which is disposed on the path along which the first and second light beams propagate to act as a lens with respect to only one of the first and second light beams so as to correct a position difference along a light propagation direction between the first and second light sources.

2. The optical pickup of claim 1, further comprising a second optical element which is disposed on the path along which the first and second light beams propagate so as to make optical axes of propagation of the first and second light beams coincidental.

3. The optical pickup of claim 2, wherein the second optical element serves as a lens complementary to the optical element only with respect to one of the first and second light beams.

4. The optical pickup of claim 3, wherein the second optical element is disposed between the light source module and light path changer or between the light path changer and the photodetector.

5. The optical pickup of claim 2, wherein the second optical element is disposed between the light source module and light path changer or between the light path changer and the photodetector.

6. The optical pickup of claim 3, wherein the second optical element additionally acts as a cover glass of the light source module.

7. The optical pickup of claim 2, wherein the second optical element additionally acts as a cover glass of the light source module.

8. The optical pickup of claim 1, wherein the optical element makes optical axes of propagation of the first and second light beams coincidental.

9. The optical pickup of claim 1, wherein the optical element is disposed between the light source module and the light path changer or between the light path changer and the photodetector.

10. The optical pickup of claim 2, wherein the optical element is disposed between the light source module and light path changer or between the light path changer and the photodetector.

11. The optical pickup of claim 1, wherein the optical element additionally acts as a cover glass of the light source module.

12. The optical pickup of claim 2, wherein the optical element additionally acts as a cover glass of the light source module.

13. The optical pickup of claim 1, wherein the optical element is disposed between the light path changer and the objective lens and comprises a transmissive type of polarizing hologram.

14. The optical pickup of claim 2, wherein the optical element is disposed between the light path changer and the objective lens and comprises a transmissive type of polarizing hologram.

15. The optical pickup of claim 1, further comprising a grating which splits one of the first and second light beams into at least three beams by diffraction while transmitting directly the other light beam.

16. The optical pickup of claim 15, further comprising a second grating which splits a light beam of a wavelength transmitted directly through the grating into at least three beams while transmitting directly a light beam of a wavelength diffracted and split by the grating.

17. The optical pickup of claim 16, wherein the grating is integrated with the second grating.

18. The optical pickup of claim 16, wherein the optical element is integrated with at least one of the grating and the second grating.

19. The optical pickup of claim 2, further comprising a grating which splits one of the first and second light beams into at least three beams by diffraction while transmitting directly the other light beam.

20. The optical pickup of claim 19, further comprising a second grating which splits a light beam of a wavelength transmitted directly through the grating into at least three beams while transmitting directly a light beam of a wavelength diffracted and split by the grating.

21. The optical pickup of claim 20, wherein the grating is integrated with the second grating.

22. The optical pickup of claim 20, wherein at least one of the optical element and the second optical element is integrated with at least one of the grating and the second grating.

23. The optical pickup of claim 19, wherein at least one of the optical element and the second optical element is integrated with the grating.

24. The optical pickup of claim 1, wherein the light source module and the photodetector are disposed so as to have the first and second light beams emitted from the light source module transmitted through the light path changer and propagate toward the recording medium and the first and second light beams reflected from the recording medium reflected by the light path changer to propagate toward the photodetector.

25. The optical pickup of claim 1, wherein the light source module and the photodetector are disposed so as to have the first and second light beams emitted from the light source module reflected from the light path changer to propagate toward the recording medium and the first and second light beams reflected from the recording medium transmitted through the light path changer to propagate toward the photodetector.

26. The optical pickup of claim 25, wherein the light path changer is a plate beam splitter.

27. The optical pickup of claim 26, wherein the plate beam splitter is oriented so as to have reflection angles of the first and second light beams be 45 degrees or less.

28. The optical pickup of claim 24, wherein the light path changer is a plate beam splitter.

29. The optical pickup of claim 28, wherein the plate beam splitter is oriented so as to have reflection angles of the first and second light beams be 45 degrees or less.

30. The optical pickup of claim 1, further comprising an adjusting lens which fits a defocus of one of the first and second light beams propagating toward the photodetector.

31. The optical pickup of claim 30, wherein the adjusting lens acts as an astigmatic lens.

32. The optical pickup of claim 30, wherein the adjusting lens acts as a sensing lens.

33. The optical pickup of claim 1, further comprising a collimating lens which is disposed between the light source module and the objective lens and collimates the first and/or second light beams divergently emitted from the light source module.

34. The optical pickup of claim 1, wherein one of the first and second light beams has a wavelength in a red wavelength region and the other light beam has a wavelength in a near infrared wavelength region, so as to have the optical pickup be compatible with digital versatile disk (DVD) family of optical disks and compact disk (CD) family of optical disks.

35. A method of correcting a position difference between first and second light sources of an optical pickup, in which the first and second light sources that emit first and second light beams of different wavelengths are integrated into a single light source module, the optical pickup, for recording and/or reproducing data with respect to a storage medium, having an optical element and a photodetector, the method comprising:
  configuring an optical system of the optical pickup so as to fit a defocus with respect to the first light beam emitted from the first light source; and
  in response to an axis of propagation direction of light beams from the first and second light sources being a z-axis, correcting a position difference along the z-axis between the first and second light sources by adjusting a position of the optical element of the optical pickup acting as a lens only with respect to the second light beam along the z-axis and fitting a defocus with respect to the second light beam.

36. The method of claim 35, further comprising:
  adjusting a position of the photodetector so as to have a spot of one of the first and second light beams emitted from the first and second light sources and reflected by the storage medium be received on a center of the photodetector of the optical pickup; and
  to correct a second position difference between the first and second light sources so as to have optical axes of propagation of the first and second light beams emitted from the first and second light sources coincide with each other, adjusting a position of a second optical element of the optical pickup that transmits directly one of the first and second light beams and refracts the other one at least twice in a rotating direction and/or in the z-axis direction so as to have a spot of the other light beam be received on the center of the photodetector.

37. The method of claim 36, wherein one of the first and second light beams has a wavelength in a red wavelength region suitable for a DVD family of optical disks and the other light beam has a wavelength in a near infrared wavelength region suitable for a CD family of optical disks.

38. The method of claim 35, wherein one of the first and second light beams has a wavelength in a red wavelength region suitable for a DVD family of optical disks and the other light beam has a wavelength in a near infrared wavelength region suitable for a CD family of optical disks.

39. The optical pickup of claim 1, wherein the light path changer is a cubic beam splitter.

40. The optical pickup of claim 1, wherein the optical element comprises:
  a polarizing hologram which transmits the first light beam and acts as a lens only with respect to one polarization component of the second light beam; and
  a wave plate which changes a polarization of incident light with respect to a wavelength of the second light beam.

41. The optical pickup of claim 1, wherein the optical pickup performs recording, as well as reproducing, with respect to the recording medium.

42. The optical pickup of claim 30, wherein:
  the light path changer is a plate beam splitter, and
  the adjusting lens is oriented in a direction opposite to that in which the plate beam splitter is tilted so as to correct coma aberrations in the first and second light beams.

43. An optical pickup for recording and/or reproducing with respect to a storage medium, comprising:
  a light source module in which first and second light sources that emit first and second light beams of different wavelengths are integrated into a single package;
  a photodetector which receives the first and second light beams and detects a signal with respect to the storage medium; and
  an optical element which is disposed on a path along which the first and second light beams propagate, acts as a lens with respect to only one of the first and second light beams, and corrects a position difference along a light propagation direction between the first and second light sources.

44. The optical pickup of claim 43, further comprising a second optical element which propagates the first and second light beams along the same optical axis and compensates a deviation of the first and second light beams from an optical axis due to a position difference in an x-y plane between the first and second light sources.

45. The optical pickup of claim 44, wherein the optical element and the second optical element have opposite power with respect to each other.

46. The optical pickup of claim 43, wherein the optical element makes optical axes of the first and second light beams coincidental.

47. The optical pickup of claim 43, wherein the optical pickup performs recording, as well as reproducing, with respect to the recording medium.

48. An optical pickup for recording and/or reproducing with respect to a storage medium, comprising:
- a light source module in which first and second light sources that emit first and second light beams of different wavelengths are integrated into a single package; and
- an optical element which is disposed on a path along which the first and second light beams propagate and acts as a lens with respect to only one of the first and second light beams,
- wherein the optical element corrects a position difference along a light propagation direction between the first and second light sources while making propagation axes of the first and second light beams coincidental.

49. The optical pickup of claim 48, wherein the optical pickup performs recording, as well as reproducing, with respect to the recording medium.

\* \* \* \* \*